May 16, 1967

C. O. CARLSON 3,319,518

SYSTEM FOR RETRIEVING MICROIMAGES FORMED ON SUPERPOSITIONED
MICROFORMS AND THE LIKE

Filed Feb. 17, 1965

INVENTOR
CARL O. CARLSON

HIS ATTORNEYS

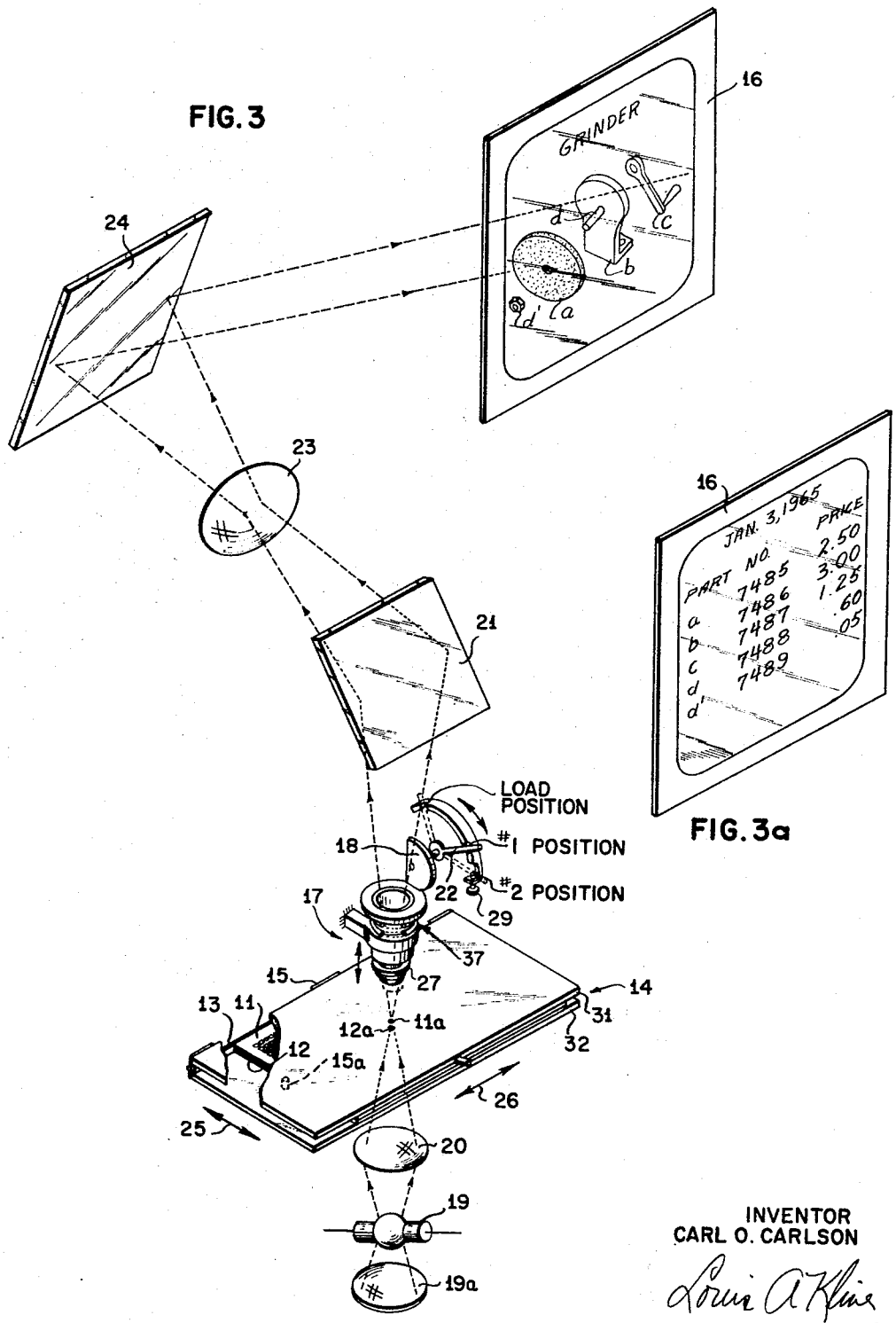

FIG. 7
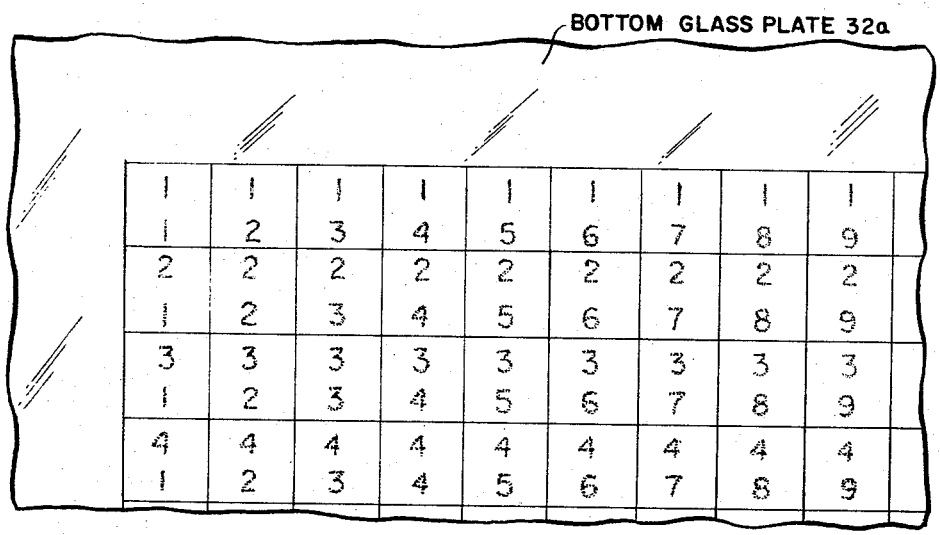
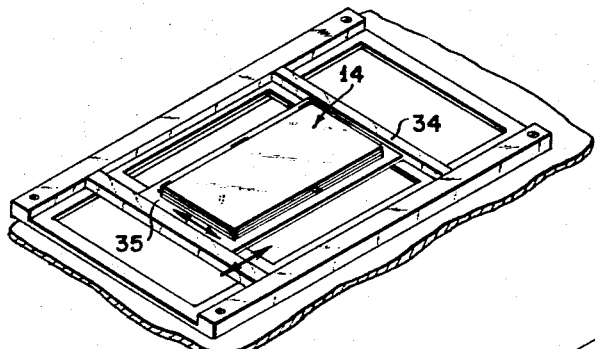
FIG. 3b
FIG. 8
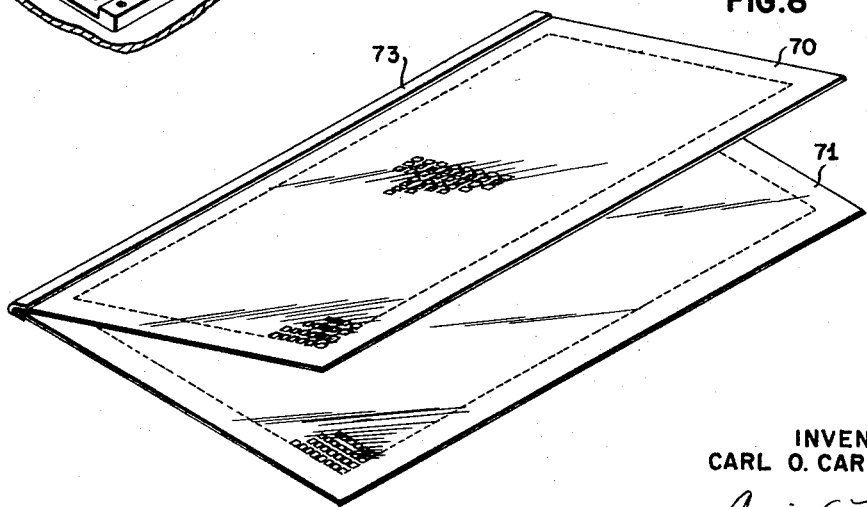
INVENTOR
CARL O. CARLSON

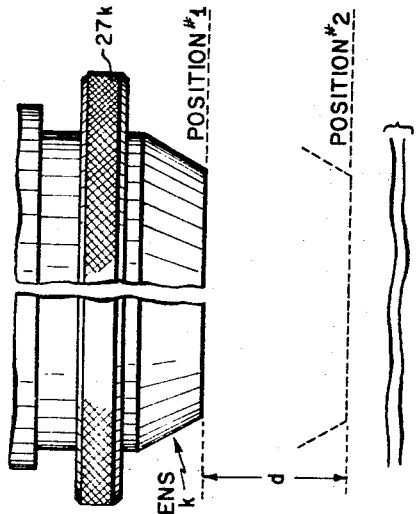
FIG. 5
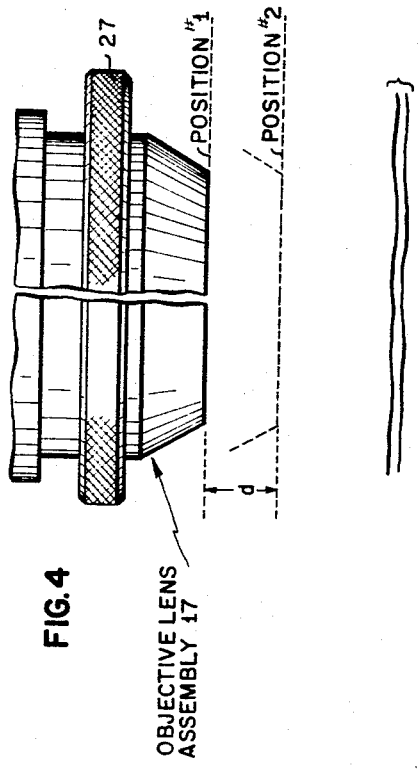
FIG. 4
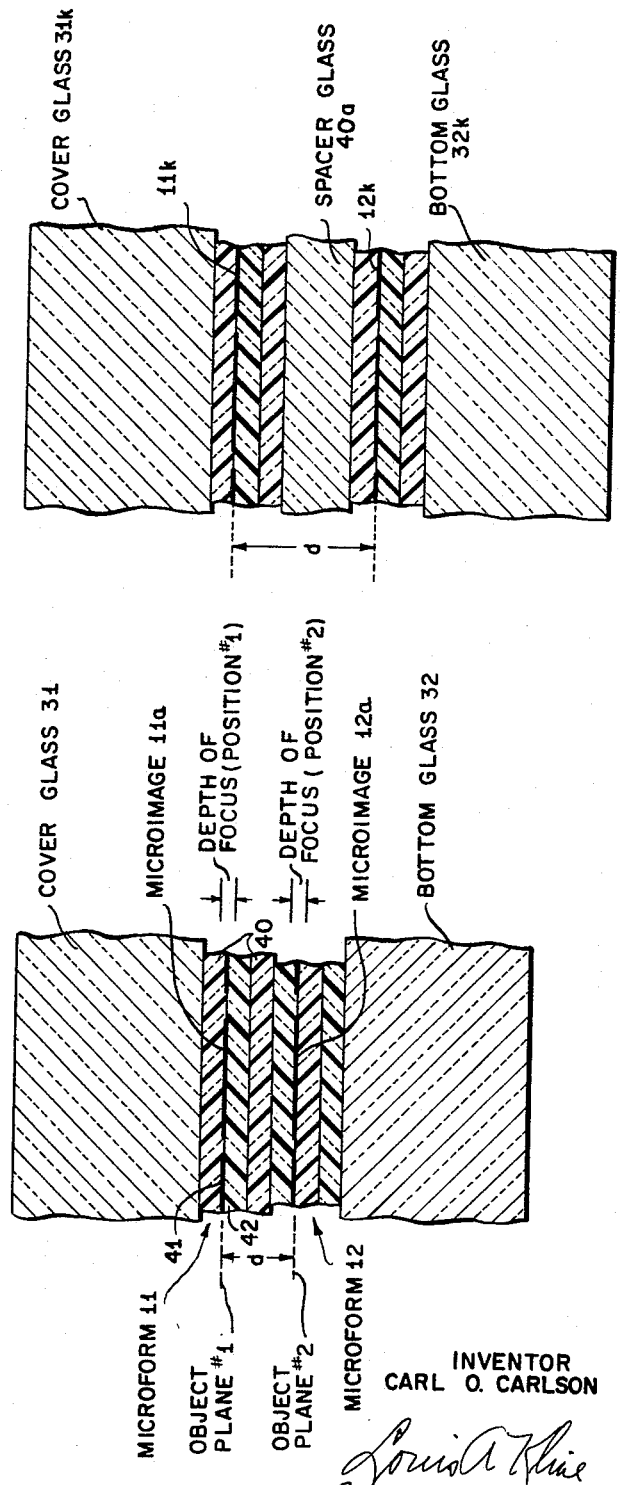
INVENTOR
CARL O. CARLSON
HIS ATTORNEYS

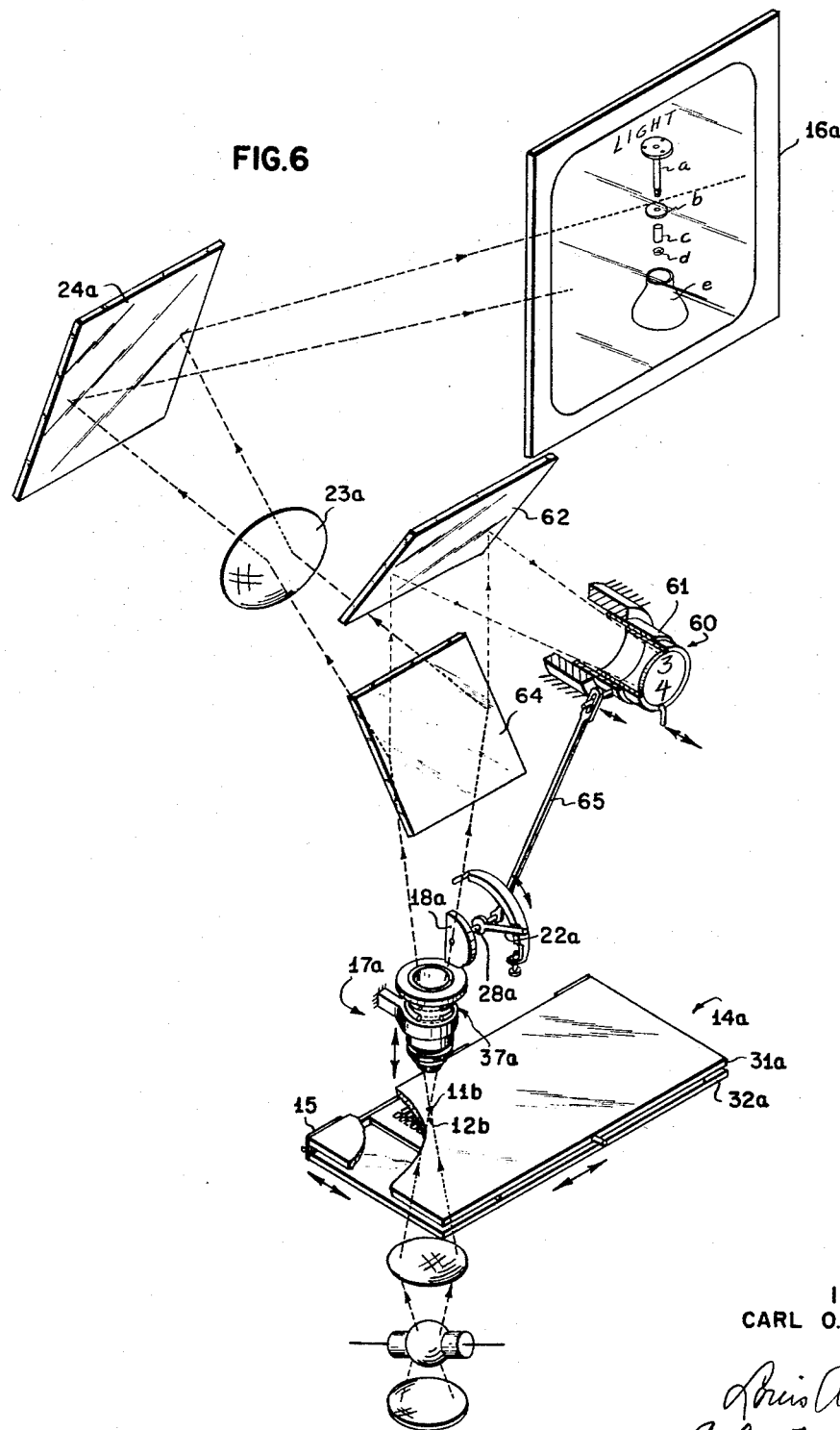

United States Patent Office 3,319,518
Patented May 16, 1967

3,319,518
SYSTEM FOR RETRIEVING MICROIMAGES FORMED ON SUPERPOSITIONED MICROFORMS AND THE LIKE
Carl O. Carlson, Los Angeles, Calif., assignor to The National Cash Register Company, Dayton, Ohio, a corporation of Maryland
Filed Feb. 17, 1965, Ser. No. 433,440
9 Claims. (Cl. 88—24)

The present invention is directed to a system for rapidly retrieving microimages formed on superpositioned microforms and, more particularly, to providing a system for displaying correlated microimages formed on superpositioned areas of a set of microforms.

In recent years the great volume of documents being produced and stored has brought about an advance in the field of microimage technology. This technology has now taken on new importance and more and more attention is being given to the employment of microimage techniques in a wide variety of fields, particularly those fields where great masses of information must be stored, retrieved and disseminated. The problem is to provide a sufficient reduction in volume of documents without creating undue problems in retrieval, dissemination and use. While a number of such system have been developed in the past which are capable of providing and utilizing microimages of 20:1 to 60:1 reduction ratios, it has been determined that it would be highly advantageous to obtain a practical system for providing and utilizing microimages at greater than 100:1 reduction ratios, since such reduction ratios make it possible to provide microimages of several thousand pages of information on individual small, easy to handle, sheets of film. An outstanding advance in providing such extremely high reduction ratio microimages has recently been achieved, and is disclosed and claimed in a commonly assigned copending patent application Serial No. 111,759, filed May 22, 1961, now U.S. Patent No. 3,185,026. This advance is also disclosed in the publication Photochromic Microimages: "A Key to Practical Microdocument Storage and Dissemination," by A. S. Tauber and W. C. Myers; Advance in Micro film Technology (Proceedings of the National Microfilm Association Eleventh Annual Meeting, April 1962), ed. by Vernon Tate, pages 256–269, Washington, D.C., Sparton Books (October 1962), also reprinted in American Documentation, vol. 13, No. 4, pages 403–409 (October 1962).

Typically, the above-mentioned advance in information storage achieves high reduction ratios of 100:1 to 200:1 by employing a two step reduction of the image of the individual documents prior to the exposure of the final photographic film. In such systems images of the documents are first reduced by being recorded on conventional microfilm, and each of these microimages is then again reduced, one at a time, and at any desired one of the high reduction ratios, and recorded to form a two dimensional array of microimages on a high resolution reversible photochromic film. It should be noted that recording of these microimages on the photochromic film does not require the formation of a latent image. After inspection indicates that all the microimages are properly formed on the photochromic film (improperly formed images being corrected, if necessary), they are then transferred in bulk by contact printing to conventional photographic emulsion, this conventional emulsion then becoming a "master" for contact printing dissemination film copies. The above-described technique may be contrasted with the prior art step-and-repeat technique where latent microimages are recorded, one at a time, directly on conventional photographic film. In such a case, no inspection or correction is possible, and any erorrs discovered after development of the latent images (which errors can occur with fairly high probability when inspection is not possible) necessitate repetition of the whole recording procedure. The rectangular sheet of photographic film is protected in accordance with the present invention by a transparent cover, and the protected film of microimages thus formed is referred to herein by the term "microform."

Having achieved the high resolution of microimages made possible by the photochromic system disclosed in the aforementioned copending patent application and article, it then becomes important to provide suitable methods and apparatus for retrieval of the information recorded therein. A microimage viewer is disclosed and claimed in a commonly assigned copending application Serial No. 329,743, filed December 1, 1963, now U.S. Patent No. 3,267,801. This microimage viewer provides many advantages in projecting onto a screen, a picture which is up to 200 times larger than the microimage from which it is formed. Thus, the information recorded on any single microimage can be admirably displayed for viewing.

It is often disadvantageous to be able to display and view only the information on a single microimage, especially where many references are required to be made to another microimage on the same film. For example, it is well known, that certain publications (e.g., catalogs, patents, etc.) very often consist in drawings and illustrations on one page (microimage) and a corresponding written description on another page (microimage) which refers to the drawing and illustration. In general, the viewer described in the aforementioned patent application, provides for only a single microimage (of a page) to be viewable at any one time and each time a different microimage is desired to be viewed, the operator must relocate the viewer to the frame of a microform containing the desired microimage. Collating the information presented by these publications, therefore, when reduced to microimages and viewed, is often exceedingly difficult because of the constant need for relocating the viewer in order to refer back and forth between the drawings and the written description. In addition, particularly with reference now to "parts catalogs," for example, certain drawings illustrating an assembly and parts thereof do not change, but very often the prices of the parts are subject to change and regular updating, and it is, therefore, desirable to replace microimages of pages containing temporary data, e.g., prices, without changing the microimages of pages illustrating the assembly and parts thereof. In many instances, therefore, it is not only desirable to provide rapid access to correlated microimages, but also to provide correlated microimages on separate films wherever one of the correlated microimages contains temporary data.

Accordingly, it is an object of the present invention to provide rapid access to different microimages in order to collate the information recorded therein.

Another object of the present invention is to provide for viewing any one of a plurality of superposed microimages recorded on separate microforms lying one on top of the other in order to provide fast access to each of the superposed microimages provided on the microforms by use of the principle of "optical sectioning," in which the depth of field of the optical system of a viewer is capable of being restricted to any desired one or more of the superposed microimages.

A further object of the present invention is to provide a three dimensional transparent or semitransparent information article including a plurality of superposed microimages of high reduction ratio which are located at different depths or levels in order to display and single one of said superposed microimages by an optical system of a viewer having a depth of field which restricts the display thereof to a single depth or level.

Still another object of the present invention is to provide means for separating superposed microimages at a desired distance in accordance with the rate of reduction of the recorded images on respective microforms, in order to separately and clearly view any single one of the superposed microimages when placed in a suitable viewer.

Another object of the present invention is to provide an information article including a set of microforms, each microform having a plurality of microimages, and wherein said article provides superposed correlated microimages in which the spacing of at least some of the superposed microimages in the separate microforms is such as to be capable of being separately and selectively displayed by a viewer, and wherein each microform in the set is detachable to enable replacing or substituting a new microform with new microimages in said article while retaining for viewing the remaining microimages in the remaining microforms.

Another object of the present invention is to provide for simultaneous display of superposed microimages of high reduction ratio.

Other objects and features of the invention will become apparent to those skilled in the art as the disclosure is made in the following detailed description of preferred embodiments of the invention as illustrated in the accompanying sheets of drawings in which:

FIG. 3 is a diagrammatic illustration of a viewer for providing access and rapid alternate display of the superposed microimages shown in FIG. 2 in which the upper microimage of the set is being displayed on a screen;

FIG. 3a shows the screen only of the microimage viewer of FIG. 3 displaying the lower one of the superposed microimages show in FIG. 2, to illustrate the operation of rapid alternate display of these microimages;

FIG. 3b shows a table assembly for the microform holder which enables the holder to orthogonally move in a fixed plane relative to the objective lens assembly of the viewer;

FIG. 4 is a view of a portion of the objective lens assembly, and a greatly enlarged fragmentary sectional view of a microform holder with microforms therein as shown in FIG. 3, for illustrating the operational positions of the objective lens assembly relative to the microimage planes of the microforms;

FIG. 5 is a view similar to FIG. 4 for showing a modification of the microform holder of the viewer shown in FIG. 3, and for illustrating the operational positions of the objective lens assembly for such a modified microform holder;

FIG. 6 is a diagrammatic illustration of a modified arrangement of the viewer of FIG. 3 which shows an indexing arrangement for providing simultaneous display of indexing data and one of the superposed microimages of a set of microforms to locate any selected set of superposed microimages for rapid alternate display thereof;

FIG. 7 is a fragmentary view of the bottom glass of the microform holder shown in FIG. 6 to show the indexing layout for the microform frame locations for microimages of a microform accurately positioned in the microform holder; and FIG. 8 shows a pair of microforms attached along one side thereof for convenience of use.

Figure 1:
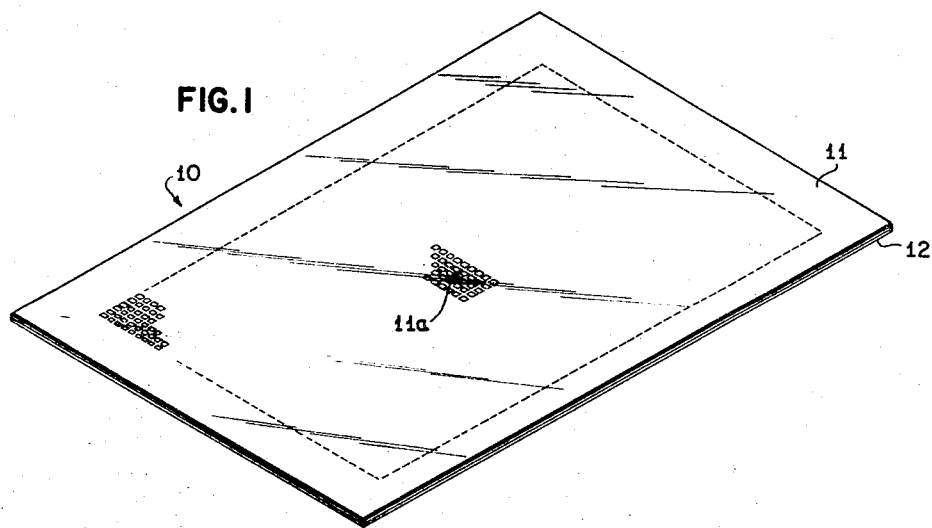
FIG. 1 is a pictorial view of a set of superposed microforms in which correlated sets of microimages in the microforms are superposed to enable rapid alternate display of either of the microimages of each set in accordance with the present invention.
Figure 2:
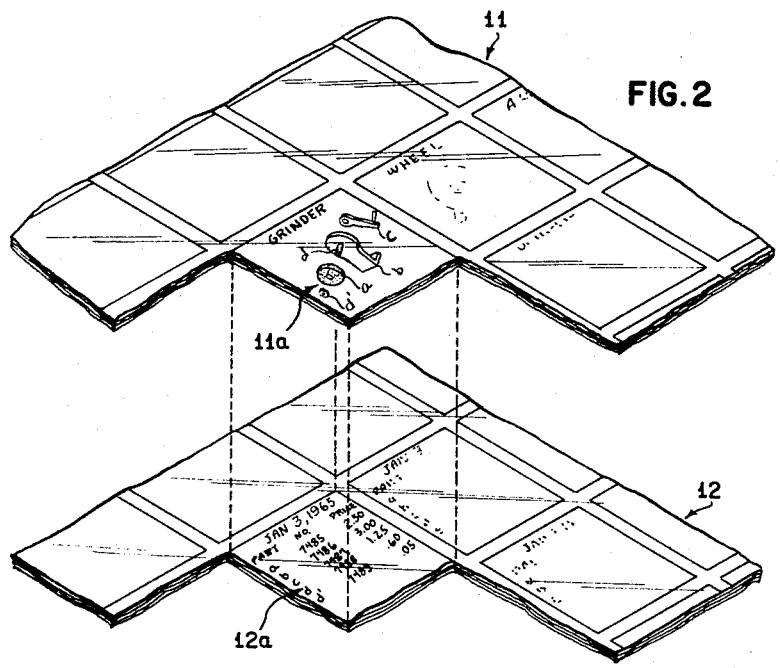
FIG. 2 is a greatly enlarged fragmentary view of the microforms shown in FIG. 1 which are shown separated in order to show superposed microimages of a typical set which can be selected for rapid alternate display for collating the information recorded thereon.

Referring now to the drawings wherein like reference numerals refer to like or corresponding parts throughout the several views; FIG. 1 illustrates a set 10 of superpositioned microforms 11 and 12 each containing a plurality of microimages including a typical microimage 11a, in the upper microform 11, which is located directly above and superposed upon another microimage 12a in the bottom microform 12, as shown more clearly in FIG. 2. It will be understood that the superpositioned microforms 11 and 12 include rectangular sheets (e.g., 4 inches by 6 inches) of flexible photographic film containing an array of 5,000 subdivisions or frames each of which is identified by specifying the row and column coordinates, and in each of which high resolution microimages are provided as disclosed in the aforementioned copending patent application Serial No. 111,759, filed May 22, 1961 now U.S. Patent No. 3,185,026. A preferred manner in which the microforms are contact printed from masters derived from photochromic film is disclosed in copending patent application Serial No. 370,314, filed May 26, 1964. Further, as disclosed later herein in connection with FIG. 4 each of the microforms 11 and 12 comprise a rectangular sheet of photographic film protected by a transparent envelope which protects the microimages thereon and also provides sufficient vertical spacing between correlated sets of microimages when the microforms 11 and 12 are superpositioned as shown in FIG. 1.

As shown in FIG. 4, it has been found to be most practical that the sheet of photographic film (e.g., 5 mils thick, i.e., 5 one-thousandths of an inch) is protected by applying a polyethylene Type B Mylar polyester laminate 40 (e.g., 5 mils thick) to each surface of the film including the silver halide emulsion side 41 (upper microimage side) of the cellulose acetate base 42 of the photographic film after coating the emulsion side 41 with a thin coating of polyvinyl acetate (e.g., "X–1272–G Photo-Coat," Dow Chemical Company). Each side of the photographic film is covered by applying the polyethylene side of the aforementioned laminate to the film by heating the laminate until it is soft and tacky and moldable so as to mold into the surfaces of the film when applied thereto under pressure, e.g., by rollers. The resulting microforms are uniform in thickness (e.g., 15 mils) and the uniformity is easily controlled to be well within one mil. Thus, when the microforms are superpositioned and pressed together, they are uniform in thickness (30 mils) and the position of each of the microimages in each set of superposed microforms can be depended upon to lie in respective parallel planes (15 mils apart) in order to require only two settings of the viewer for rapid alternate display of any selected set of superposed microimages when placed in the viewer for display as set forth fully, infra, in connection with FIG. 4.

Referring now to FIG. 3, the preferred embodiment of the microimage viewer is shown for displaying the typical set of superimposed microimages 11a and 12a, alternately and in rapid succession, to enable a person looking at the screen to collate the information contained therein. Microforms 11 and 12, which include the microimages 11a and 12a, respectively, are accurately positioned between glass plates 31 and 32 of a microform holder 14 by proper alignment of reference edges of the microform (top edge and left edge as shown in FIG. 1) and a reference edge 13 and a reference pin 15a of the holder as shown in FIG. 3. The sets of microimages (e.g., 5000 sets) are thereby accurately superposed upon one another in the holder 14 whereby all of the sets of superposed microimages of microforms 11 and 12 are precisely aligned above and below one another so that any such selected set of microimages, which are positioned for viewing, can be rapidly and alternately displayed by the viewer on the screen 16. Rapid alternate display of any selected set of superposed microimages is provided by a slight vertical adjustment (e.g., 15 mils)

of a microscope objective lens assembly 17 by a simple movement of a lever 22 between alternate positions #1 and #2 in a manner described in detail, infra.

At this point, it is important to note that because of the large magnification required to display the microimages of over 100:1 reduction ratios (e.g., 150:1); the lens assembly 17 (providing 10 times magnification, i.e., 10×) need be moved only a small distance $d$ vertically (FIG. 4) to alternately display superimposed microimages of a set. This is a decided advantage over systems for viewing larger images of 20:1 to 60:1 reduction ratios since, in most instances, the optical systems of the latter, e.g., 35 mm. slide projector type optical systems, have much lower order magnification, and therefore require movement over much larger distances $d$. Likewise, such low reduction ratios require larger separation of images in order to separately view the superposed images. One of the reasons for this important difference is because of the larger numerical aperture (.25, for example) and the smaller depth of focus (3 mils, for example) provided by the objective lens assembly 17 of the optical system of the viewer in FIG. 3, which is highly suitable for the viewing of microimages having a reduction ratio of 150:1 or more. These features will be made more clearly evident in the further discussion of this viewer in the following detailed description of FIG. 3.

As shown in FIG. 3, the preferred embodiment of a microimage viewer of the present invention comprises an optical system for projecting onto a viewing screen 16 a large picture of any selected set of superposed microimages provided on the microforms 11 and 12 positioned in the holder 14. The enlarged picture on the screen 16 is, for example, about 150 times larger than the microimage whose size is about .04 inch by .05 inch on the microform. A high intensity light source for the viewer is shown in FIG. 3 to comprise a lamp 19 and reflector 19a which aids in directing the light emanating from the lamp 19 to a condensing lens 20 which focuses this light on the typical selected set of superimposed microimages 11a and 12 a, located directly below the objective lens assembly 17 and between the glass plates 31 and 32 of the holder 14. The resulting light beam produced thereby, passes through microimages 11a and 12a, through the objective lens assembly 17 and onto a folding light mirror 21 which is disposed at an angle to reflect the light beam through a projection lens 23 and onto another folding light mirror 24, to be reflected thereby onto the screen 16, for display of either one of the microimages 11a or 12a, depending upon the position setting of the objective lens assembly 17. In the present arrangement, shown diagrammatically in FIG. 3, the objective lens assembly 17 comprises, for example, an optical system having a 10× objective lens assembly with the required optical features that are more fully explained in the aforementioned copending patent application Serial No. 329,743 now U.S. Patent No. 3,267,801.

Continuing the description of FIG. 3, more particularly with relation to locating and positioning any set of superposed microimages of the microforms 11 and 12; the microform holder 14 is shown disposed for movement in orthogonal directions as indicated by the arrows 25 and 26 shown next to the holder 14 in FIG. 3. A suitable table assembly, including movable carriages 34 and 35 for supporting and providing these orthogonal movements, is shown in FIG. 3b. This table assembly provides for positioning for viewing any set of microimages of microforms 11 and 12, while maintaining the microimages of the microforms 11 and 12 at respective preset distances from the objective lens assembly 17. Another suitable table assembly for the viewer is shown and disclosed in greater detail in the aforementioned copending patent application Serial No. 329,743 now U.S. Patent No. 3,267,801.

In FIG. 3, the microform holder 14 is shown to be constructed to open up to receive both microforms 11 and 12 and to close over the microforms to hold and press them flat between flat glass plates including upper glass plate 31 and lower glass plate 32. The upper glass plate 31 is hinged to the lower glass plate 32 by a hinged flange member 15. After the microforms 11 and 12 have been placed in the holder between the upper and lower glass plates 31 and 32, the microforms are held tightly between the glass plates by a spring latch, for example, (not shown) whereby the microforms 11 and 12 are maintained in the respective object planes, i.e., object planes #1 and #2 shown in FIG. 4. Thus, it is seen that the holder 14 provides for orthogonal movement of the microforms 11 and 12 to position the typical set of superposed microimages 11a and 12a below the objective lens assembly 17 and maintain these superposed microimages in respective parallel object planes #1 and #2 (15 mils spacing, for example) in order to alternately display each of the superposed microimages 11a and 12a on the screen 16 by adjustment of the objective lens assembly 17 by moving lever 22 to positions #1 and #2. As shown in FIG. 3, lever 22, in position #1, positions the lens assembly 17, by means of cam 18, to project the typical microimage 11a, for example, on the screen 16 for display; and by a simple movement of the lever 22 to position #2, the lens assembly is properly located to project microimage 12a on the screen 16 (FIG. 3a). To provide greater ease in operation of lever 22, it is preferable to spring load or bias the lever 22 in a clockwise direction as viewed in FIG. 3. Also, it should be noted that suitable means 37 are provided to spring load or bias the lens assembly 17 upwardly to follow the periphery of cam 18.

The operation of the viewer of FIG. 3 will now be described to illustrate alternate display of the typical selected set of superposed microimages 11a and 12a on the respective microforms 11 and 12. The first step in the operation of the viewer is to properly load and accurately position the microforms 11 and 12 in the microform holder 14. The lever 22 is moved to the "load" position which raises the objective lens assembly 17 to permit the upper glass plate 31 to be raised for insertion of the microforms 11 and 12. Once the upper glass plate 31 is raised, the set of microforms 11 and 12 are easily inserted in the holder 14 and accurately positioned on the lower glass plate 32 with the upper edge and the edge on the left side of the microforms abutting the reference edge 13 and reference pin 15a, respectively. Having thus positioned the set of microforms 11 and 12, the correlated sets of microimages therein are disposed directly above and below one another. When the upper glass plate 31 is lowered, the microforms 11 and 12 are pressed tightly against the upper and lower glass plates and in firm engagement with one another. Having loaded the holder 14 in the foregoing manner, the objective lens assembly 17 is lowered by moving lever 22 to position #1 and the holder 14 is moved orthogonally to position the typical microimages 11a and 12a, for example, directly under the objective lens assembly 17 in accordance with the description which follows.

The locations of the sets of microimages are identified by their frame positions which are subdivisions (row and column coordinates) of the microforms 11 and 12. Thus, typical microimages 11a and 12a are identified by their location in frame 25–50, for example 50 rows and 100 columns in each microform). In the frame designation 25–50, the number 25 refers to row 25 and the number 50 refers to column 50. Superposed frames 25–50, containing the microimages 11a and 12a, are positioned under the objective lens assembly 17 for display on screen 16 by moving the holder 14 until frame 25–50 is positioned below the objective lens assembly 17 (which can be identified by row and column indicators (not shown) on the holder carriages of the table assembly (FIG. 3b)); or by the indexing system arrangement to be described later and shown in FIGS. 6 and 7, for example. In either of the foregoing manners, therefore, the selected frame 25-50 is placed properly in position for displaying the typical microimages 11a and 12a, shown in FIG. 2.

In the previously described loading and positioning operation, the objective lens assembly 17 was lowered into position by moving lever 22 from the "load" position to position #1. As shown in FIG. 4, the lens assembly 17 is thereby moved to position #1 to focus on microimage 11a which is the only microimage of the set that is within the depth of field of the lens assembly 17 and is therefore the only microimage projected and displayed on the screen 16 (FIG. 3). Thus, as illustrated more clearly in FIG. 4, it should be noted that the depth of focus of the microscope objective lens assembly 17 (e.g., 10× magnification) is very short, i.e., on the order of 3 mils (focal length of approximately 16 millimeters). An initial fine adjustment, by a fine adjustment knob 27 of the lens assembly 17, may be required to focus microimage 11a on the screen 16. Having once provided this initial fine adjustment to focus the microimage 11a on the screen 16, no further adjustment should be required for displaying any other one of the 5000 microimages of microform 11.

After observing the microimage 11a displayed on the screen 16 (FIG. 3), the operator and/or observer notes the grinder assembly and particular desired parts thereof and then operates lever 22 to move it to position #2 to display the correlated microimage 12a which, for example, identifies the desired part of the assembly according to the part number and also the price thereof, as shown displayed on the screen 16 in FIG. 3a.

An initial fine adjustment is provided for all microimages in microform 12 by a fine adjustment for lever 22 in position #2. Exact focusing of microimage 12a, as required to compensate for any slight variation in thickness of individual microforms, is provided as shown in FIG. 3 by fine adjustment screw 29 which controls the exact position of the lever 22 when in position #2. As previously noted, the lever 22 is preferably spring loaded in a clockwise direction by spring loading means 37. Thus, when lever 22 is placed in position #2, it is biased against the end of screw 29 which is adjusted to the desired position to provide the desired fine adjustment of focusing on microimage 12a and therefore, any one of the 5000 microimages of microform 12 which may thereafter be positioned under lens asembly 17 for display. It is important to note the simplicity of operation required to provide alternate display of the correlated microimages 11a and 12a on the screen 16 and any of the other 5000 sets of microimages of microforms 11 and 12, particularly after the initial fine adjustments are made for the first set of microimages 11a and 12a which is the only fine adjustment normally required for displaying any of the remaining 5000 sets of microimages in microforms 11 and 12. Each movement of the lever 22 between positions #1 and #2 moves the objective lens assembly 17 between positions #1 and #2 (FIG. 4) to bring the microimages 11a and 12a into focus for display on the screen 16. Accordingly, when desired, the operator may refer back to the upper microimage 11a repeatedly after viewing microimage 12a to verify the part number or to obtain information for other parts. When no further information is required from this set of microimages 11a and 12a, the operator may select a new set of microimages of the 5000 sets on the microforms 11 and 12 by repositioning the microform holder 14 to the frame coordinates of the new set of microimages.

In FIG. 4, the illustration provides a basis for a clearer understanding of the principles of operation of the viewer of the present invention. As shown in FIG. 4, the microimage 11a in microform 11 is in object plane #1 and the microimage 12a in microform 12 is in object plane #2. In position #1 of objective lens assembly 17, only microimage 11a will be projected and displayed on the screen 16 as shown in FIG. 3. Furthermore, microimage 12a in object plane #2 will not be projected and displayed on screen 16 and will not affect the clear display of microimage 11a on the screen. As shown in FIG. 4, therefore, with the objective lens assembly 17 focused on the microimage 11a in an object plane #1, any opaque or light reflecting object area of microimage 11a will produce a corresponding dark image area on the screen 16. On the other hand, any opaque or light reflecting area in microimage 12a in object plane #2 is not effective to produce a corresponding dark image area but will be only effective to produce a slight decrease in the overall light transmission to the screen 16. Further, because of the relatively large numerical aperture of the present objective lens assembly 17, there is no possibility of microimage 12a casting a shadow of an image thereon on the screen 16 even though the distance d between object planes is only 15 mils, for example. Accordingly, it is an important feature of the preferred arrangement of the present invention that a set of superpositioned microforms, each 15 mils thick, can be directly inserted into the microform holder 14 (FIG. 3) for viewing without the need of spacers between microforms (as shown by the modified arrangement in FIG. 5) or without the need for increasing the thickness of the microforms as normally provided. However, when the microimages have reduction ratios near 100:1 or less, a spacer glass 40a shown in FIG. 5 is found to be desirable to prevent visible shadows appearing on the screen 16 from microimage 12a when focused on microimage 11a or vice versa. A lower magnification objective lens assembly 17k in shown in FIG. 5 for use in the viewer in which the spacer glass 40a is provided to space microforms 11k and 12k having lower reduction ratios, e.g., on the order of 100:1 or less.

Another important consideration in providing better display of superposed microimages is to provide optimum light transmission for improved display and viewing. In the systems of the present invention, the stopping or blocking of light by either one of the sets of microimages which is not being displayed, e.g., microimage 12a when displaying microimage 11a or vice versa, has been minimized to provide for optimum light transmission. Microforms for highly reduced images as normally provided do not present a problem in this regard. It should be noted, however, that even though a superposed microimage is not in focus, it will block some light, and an excessive proportion of light absorbing or light reflecting areas on the microforms should therefore be avoided to provide optimum display of microimages on the screen 16. Thus, when having control of the forming and printing of documents, line width should be limited and unnecessary shading or other unnecessary dark or light reflecting areas should be avoided.

In FIG 6, the preferred viewer system arrangement of FIG. 3 has been modified by adding a second small screen 60, (approximately one inch in diameter) to view microform frame indexing indicia or data, which is preferably etched on the bottom glass plate 32a and projected on the screen 60. This indexing indicia can be considered as a third microimage which is positionally aligned with microimages such as 11b and 12b of microforms 11 and 12. In order to project this indexing indicia etched on the bottom glass 32a (FIG. 7) on the screen 60, an additional folding mirror 62 is disposed in the path of a light beam, emanating from the microscope objective lens assembly 17a, and passing through a beam splitter 64 which has been substituted for the folding mirror 21 shown in FIG. 3. The beam splitter 64 comprises, for example, a mirror having a predominately reflecting surface but which passes approximately 1% of the light therethrough to be reflected from the added folding mirror 62. This modified viewer arrangement provides for simultaneous display of information on both of the screens 16a and 60.

A mechanical linkage 65 is shown in FIG. 6 to be coupled between shaft 28a, for lever 22a, and the center telescoping tube 61 for the screen 60 in order to move the screen 60 in and out concurrently with the lens assembly 17, to thereby maintain the indexing indicia on the screen 60 in focus for each position #1 and #2 of lens assembly 17. The rotary motion of the shaft 28a is converted to linear motion of the tube 61 by this mechanical linkage 65. The distance of linear movement of the screen 60 is adjusted to be approximately 100 times the movement of the lens assembly 17a. Accordingly, the mechanical linkage 65 between shaft 28a and the tube 61 provides approximately one and one-half inches of linear movement of screen 60 when moving the lens assembly 17 the distance between object plants #1 and #2 which are separated by 15 mils, for example. Suitable decoupling means at the connection of this linkage to the shaft 28a (not shown) is provided for decoupling the mechanical linkage 65 in order to enable the lever 22a to move to the "load" position without moving the tube 61 past the position shown in FIG. 6. In this manner the indexing indicia is focused on the screen 60 for each of the positions #1 and #2 of the lens assembly 17 to enable the operator to view the display of either one of microimages and the indexing indicia.

In operation, the amount of light passing through the beam splitter 64 is adequate to display the indexing indicia on the small screen 60 and give the same illumination as on screen 16a (assuming it is approximately 100 square inches) since the areas are proportional to the light transmitted thereto. One the other hand, the small amount of light, approximately 1%, which has been passed by beam splitter 64 and projected on screen 60, does not noticeably detract from the display of the microimages on the screen 16a.

The operation of the embodiment shown in FIG. 6 is identical to that of the preferred embodiment shown in FIG. 3 except for the additional feature of simultaneously displaying the indexing indicia on the screen 60. This feature is employed to locate the microimage desired by microform frame coordinates etched on the bottom glass 32a, a portion of which is shown in FIG. 7. For example, when it is desired to display the drawing of a microimage 11b, known to be located in frame 3–4 (i.e., row 3, column 4), the microfilm holder 14a is moved orthogonally until the identifying indicia 3–4 is displayed on the indexing screen 60 as shown in FIG. 6. It should be noted at this point that the distance of the indexing screen 60 from the objective lens assembly 17a is such that only the indexing indicia etched on the bottom glass is displayed on the screen 60. Further, as shown and as previously discussed, the position of the screen 60 is made adjustable in the direction indicated, to bring the indexing indicia in exact focus on the screen 60. Since light on the screen 60 has not passed through a projection lens after leaving the objective lens assembly 17a, the image can be displayed on the small screen 60 because no additional magnification is provided by a projection lens, e.g., projection lens 23a for display on screen 16a (15× magnification).

After the microimage 11b has been located and positioned by noting the desired frame identifying indicia (e.g., 3–4) on the screen 60, the microimage 11b is displayed simultaneously on the main screen 16a and the operation proceeds as described in connection with FIG. 3 including the alternate display of microimages 11b and 12b by positioning of lever 22a. When another set of microimages is desired to be displayed at a new frame location, the above-described operation is repeated to locate and position the new set of microimages by observing the frame identifying indicia on the indexing screen 60.

An important consideration in the foregoing modified viewer arrangement concerns the use of the etched bottom glass 32a. In prior discussions of light transmission, it was noted that the amount of light transmitted to the main screen 16 was dependent upon the thickness of lines, shading and other characteristics of the individual microimages of each set being displayed and the intensity of light source. Because the indexing screen 60 is small, the amount of light transmitted thereto need only be small to illuminate the screen 60 sufficiently to adequately display the indexing indicia for viewing in a lighted room. However, the etched indicia on the top surface of the bottom glass provides an important advantage in providing maximum light transmission while still providing for display on the screen 60. This is an important feature because it provides for a greater amount of light transmission than any of the microforms having the same indicia printed thereon. The reason is that the lines of the indicia etched in the glass do not act to stop light by reflection or absorption but only scatter the light, most of which is still made available for illuminating the screens 16a and 60 after it is passed through the set of superposed microimages and the optical system shown in FIG. 6. Thus, it can be assumed that only the 1% of the light which is diverted to screen 60 is not transmitted to the screen 16a. The reason, of course, that effective use of light is such an important consideration is not because of any additional expense associated with a higher intensity light source but other problems accompanying higher intensity light sources, e.g., the serious problem of burning of the microforms unless complicated cooling arrangements are provided therefor. On the other hand, it is desirable to provide efficient use of available light to properly display the microimages for view on the screen without the need for reducing the ambient light, i.e., darkening the room or providing a large hood or light shade for the screen in order to view the data displayed thereon.

In the light of the above teachings of this embodiment of the invention shown in FIG. 6, it should be evident that superposed microimages 11b and 12b are capable of being simultaneously displayed on respective separate screens similar to screen 16a. Thus, in order to simultaneously display two superposed microimages 11b and 12b, a screen similar to screen 16a is substituted for screen 60 to display microimage 12b simultaneously with the display of microimage 11b on screen 60. To provide for this simultaneous display of microimage 12b, a projection lens similar to projection lens 23 is inserted between beam splitter 64 and light folding mirror 62 to enlarge the image projected thereby. The screen for microimage 12b should be adjusted to provide for the difference in distance of the microimages 11b and 12b from the objective lens assembly 17a. Also, a different beam splitter is substituted for beam splitter 64 to provide for passing 50% of the light to the new, larger screen for displaying microimage 12b. In order to provide adequate illumination for each screen displaying both microimages 11b and 12b, without increasing the light intensity of the light source, it is desirable to reduce the size of both screens so that the combined viewing area is maintained the same as on the single screen 16a.

Referring now to FIG. 8, a set of superposed microforms 70 and 71 are shown which are attached to one another along adjacent edges thereof so as to be easily detachable for replacement of one of the microforms. As shown, the microforms 70 and 71 are attached by a tape 73 having an adhesive backing, for example, so that the correlated microimages are superposed exactly when the microforms 70 and 71 are pressed together in their normal relationship in the holder 14 of the viewer or in storage. The set of attached microforms 70 and 71 include one microform 70, for example, which has microimages of documents which can be considered static or permanent data (e.g., catalog pages of parts) and the other microform 71 which has microimages of temporary data (e.g., catalog pages of prices of the parts). Thus, the microform 71, having temporary data, can be easily detached and replaced with another microform 71 having up-to-date data (e.g., prices) whenever the temporary data changes. An important advantage, therefore, of the set of attached microforms shown in FIG. 8 is that permanent data and temporary data are on separate microforms, and not mixed on a single microform, whereby only the microimages of temporary data need be discarded and replaced, and the permanent data is retained. This minimizes the cost of maintaining a file having current data. Another advantage of having attached microforms is that superposed microforms in a set need be aligned only when they are attached to one another and thereafter, there is no need to align them when placing them in the holdover 14 of the viewer. Other advantages of this article shown in FIG. 8 are more clearly evident including the advantage of keeping the correlated microimages of the microforms together to simplify search and access thereto in storage and use.

In the light of the above teachings, various modifications and variations of the present invention are contemplated and will be apparent to those skilled in the art without departing from the spirit and scope of the invention.

What is claimed is:

1. An article of manufacture comprising: a first microform including a first high resolution film having a base and an emulsion coating on which a two dimensional array of microimages is formed, and a transparent protective layer of substantially uniform thickness disposed on both the upper and lower surfaces of said first film, a second microform including a second high resolution film having a base and an emulsion coating on which a two dimensional array of microimages is formed, and a transparent protective layer of substantially uniform thickness and disposed on both the upper and lower surfaces of said second film, means for disposing said microforms one on top of the other such that the microimages formed in one array are superposed above the correspondingly positioned microimages formed in the other array, the plane formed by the emulsion coating on one of said films being spaced a predetermined distance from the parallel plane formed by the emulsion coating on the other film in accordance with the reduction ratio of the microimages formed on the film, said latter means including means for detachably interconnecting said microforms to superpose corresponding microimages of respective arrays whereby any one of the microforms can be separated from the other and another microform be detachably connected thereto for interchangeably superposing microimages of respective microforms.

2. A system for photographic information retrieval in which said information consists of photographic microimages of documents wherein the reduction ratio is at least 100:1 comprising: a plurality of microforms, each of said microforms comprising a film including a film base of uniform thickness having a corresponding coordinate array of said highly reduced microimages thereon, each having a document reduction of at least 100:1 and transparent laminates of uniform thickness covering the upper and lower surfaces of said film; microform holder means including means for precisely superpositioning said microforms to superpose a set of corresponding microimages of respective microforms in respective parallel planes closely spaced by the combined thicknesses of only said laminates and film base between microimages of adjacent microforms to provide for separate display of any one microimage of each superposed set of microimages, and means for producing coordinate movements of said microforms in said parallel planes for locating and selectively positioning any set of microimages; optical means including a light source for passing light through any selected set of microimages of the respective microforms and a lens assembly for projecting light passed by said selected set of microimages, said lens assembly having a numerical aperture of approximately .25 and a depth of focus of approximately 3 mils to provide optimum light transmission for selective display of any one of said selected set of closely superposed microimages; microimage display means disposed at a predetermined distance along the path of light passed by said lens assembly for displaying any one of said selected set of microimages; and position control means coupled to said lens assembly, said position control means including indexing means for positioning said lens assembly at any indexed position in which any desired one of said microimages of the selected set of microimages is indexed to be within the depth of focus of said lens assembly for selectively displaying any desired one of said selected set by said display means.

3. A system for retrieving photographic microimages of documentary information reduced in area at least 10,000:1 comprising: first and second microforms, each of said microforms including a photographic copy having microimages of said information arranged in coordinate arrays wherein the area of individual lines thereon is reduced 10,000:1, and thin transparent laminates of uniform thickness covering the upper and lower surfaces of said photographic copy; microform holder means for superpositioning one of said microforms on top of the other in direct contact such that said photographic copies are disposed in closely spaced parallel planes and correspondingly positioned microimages of the respective arrays are superposed to form a coordinate array of sets of microimages, said microform holder means further including means for providing coordinate movements of said microforms in said parallel planes to position any selected set of microimages for projection thereof; a light source directed to pass light through the selected set of positioned microimages; optical means including an adjustable lens assembly for projecting light passed through the selected set of microimages along a light path for producing an image of either one or the other of said selected set; and indexing means for producing relative indexed movements of said lens assembly and microholder to produce an image only of either one or the other of the microimages of the selected set at a predetermined distance along said light path.

4. The system in accordance with claim 3 in which said adjustable lens assembly has a depth of focus of approximately 3 mils and the thickness of the laminates between said photographic copies is greater than said depth of focus whereby only one of the superposed microimages is imaged at said predetermined distance along said light path and no other image or discernible shadow thereof is evident at said predetermined distance.

5. A system for display of coordinate arrays of microimages of documents wherein the reduction ratio is at least 100:1 comprising: a set of microforms, each of said microforms including a highly light-transmissive photographic film having a coordinate array of said microimages formed thereon and light-transmissive laminates of uniform thickness covering said film; microform holder means for holding said microforms in direct surface contact with one another to superpose corresponding microimages spaced in separate and parallel object planes, said holder means further including means for providing coordinate movements of said microforms in said parallel planes in order to project and display microimages of any selected set of microimages of said coordinate arrays; optical means including a light source and a lens assembly having an objective lens of a relatively large numerical aperture and a relatively short depth of focus for enlarging said microimages by at least 100:1 and wherein said depth of focus is less than the spacing between superposed microimages; and indexing means providing predetermined indexed movements of said lens assembly for selectively indexing each one of said microimages of any selected set for alternate projection and display.

6. A system for displaying microimages comprising: a set of superpositioned microforms disposed in respective parallel planes, each of said microforms including a plurality of microimages and superposed on corresponding microimages of other microforms of said set of microforms; a viewer for said superposed microimages including a microform holder and optical means for greatly enlarging said projecting images of information including any selected set of said microimages, said optical means including a light source and a single objective lens assembly having a single optical axis, said microform holder being disposed between said light source and said objective lens assembly and including means for moving said set of microforms transverse to said optical axis to center any selected set of microimages on said optical axis for projecting light from a plurality of said microimages of a superposed set along a single light path; light divider means disposed in said light path for dividing said light into separately projected light beams; and a plurality of image display means disposed at different image distances for simultaneously displaying a plurality of images projected by said separate light beams.

7. The system according to claim 6 in which indexing means are provided for producing indexing movements of said objective lens assembly along said optical axis to selectively display at least a predetermined one of said set of superposed microimages and one of said plurality of image display means is coupled to said lens assembly to be moved proportionally to said lens assembly to provide for continuous display of an image of information disposed on said optical axis for projection by said lens assembly.

8. The system in accordance with claim 7 in which said microform holder includes a glass plate and information including indexing indicia is formed on said glass plate by providing light scattering lines forming said indicia, and said image display means comprises light screens for forming images thereon and said movable one of said light screens is substantially smaller in area than at least one other light screen for displaying said microimages, and said light divider means produces a separately projected light beam for producing images of said indicia on said smaller light screen at the same level of light intensity as said microimages on said other light screen.

9. The system in accordance with claim 6 in which said light divider means comprises a beam splitter, said image display means comprises a plurality of light screens of different size and said beam splitter divides the light proportionally in the separate beams in accordance with the size of the respective light screens whereby simultaneous displays of said images are produced at approximately the same light level on said screens.

References Cited by the Examiner
UNITED STATES PATENTS

| 3,161,105 | 12/1964 | Offensend | 88—24 |
| 3,191,490 | 6/1965 | Rabinow | 88—24 |

NORTON ANSHER, *Primary Examiner.*

H. H. FLANDERS, R. A. WINTERCORN,
*Assistant Examiners.*